(12) United States Patent
Yuan et al.

(10) Patent No.: US 9,123,386 B2
(45) Date of Patent: Sep. 1, 2015

(54) DATA STORAGE SYSTEM AND A METHOD FOR MEASURING A CHANGE IN A SPACING BETWEEN A HEAD AND A STORAGE MEDIUM OF A DATA STORAGE SYSTEM

(71) Applicant: Agency for Science, Technology and Research, Singapore (SG)

(72) Inventors: Zhimin Yuan, Singapore (SG); Bo Liu, Singapore (SG); Shengbin Hu, Singapore (SG); Chun Lian Ong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/666,118

(22) Filed: Nov. 1, 2012

(65) Prior Publication Data

US 2013/0114161 A1    May 9, 2013

(30) Foreign Application Priority Data

Nov. 3, 2011   (SG) ............................... 201108122-1

(51) Int. Cl.
   *G11B 5/60*        (2006.01)
   *G11B 27/36*      (2006.01)

(52) U.S. Cl.
   CPC ............... *G11B 27/36* (2013.01); *G11B 5/607* (2013.01); *G11B 5/6011* (2013.01); *G11B 5/6029* (2013.01)

(58) Field of Classification Search
   CPC ...... G11B 5/6011; G11B 5/60; G11B 5/6029; G11B 5/6041; G11B 11/1058; G11B 5/581; G11B 11/10576; G11B 15/62; G11B 21/21

USPC .............................. 360/39, 55, 31, 30, 75, 43
See application file for complete search history.

(56) References Cited

U.S. PATENT DOCUMENTS

| | | | | |
|---|---|---|---|---|
| 6,088,176 A * | 7/2000 | Smith et al. | ..................... | 360/46 |
| 6,097,559 A * | 8/2000 | Ottesen et al. | ................. | 360/31 |
| 6,930,844 B2 | 8/2005 | Yeh et al. | | |
| 7,136,250 B1 * | 11/2006 | Wu et al. | .......................... | 360/75 |
| 7,180,692 B1 * | 2/2007 | Che et al. | ......................... | 360/31 |
| 7,359,139 B1 * | 4/2008 | Wu et al. | .......................... | 360/75 |
| 7,697,223 B2 * | 4/2010 | Eaton et al. | .................... | 360/31 |

(Continued)

OTHER PUBLICATIONS

Yuan, et al., A New Code Pattern of Triple Harmonic Method for Precise In-Situ FH Measurement in Perpendicular Recording, 47 IEEE Transactions on Magnetics, 3418 (2011).

*Primary Examiner* — Thomas Alunkal
(74) *Attorney, Agent, or Firm* — K David Crockett, Esq.; Niky Economy Syrengelas, Esq.; Crockett & Crockett, PC (57) ABSTRACT

A method for measuring a change in a spacing between a head and a storage medium of a data storage system. The method includes obtaining a first readback signal from the storage medium using the head at a first spacing between the head and the storage medium, determining a first power spectrum density over a frequency range from the obtained first readback signal, obtaining a second readback signal from the storage medium using the head at a second spacing between the head and the storage medium, determining a second power spectrum density over the frequency range from the obtained second readback signal, and providing a measurement indicative of the change in the spacing based on the determined first power spectrum density and the determined second power spectrum density. A data storage system is also provided.

16 Claims, 4 Drawing Sheets

(56) References Cited

U.S. PATENT DOCUMENTS 7,903,365 B2 * 3/2011 Watanabe .................. 360/75
8,369,190 B2 * 2/2013 Polley et al. ............... 369/13.11
2004/0233561 A1 * 11/2004 Yeh et al. .................. 360/31
2008/0074784 A1 * 3/2008 Aoyama ................. 360/125.02
2011/0149428 A1 * 6/2011 Franca-Neto et al. ......... 360/75
2012/0075744 A1 * 3/2012 Yoon et al. .................. 360/75

* cited by examiner

DATA STORAGE SYSTEM AND A METHOD FOR MEASURING A CHANGE IN A SPACING BETWEEN A HEAD AND A STORAGE MEDIUM OF A DATA STORAGE SYSTEM

CROSS-REFERENCE TO RELATED APPLICATION

This application claims the benefit of priority of Singapore patent application No. 201108122-1, filed Nov. 3, 2011, the contents of which are incorporated herein by reference for all purposes.

TECHNICAL FIELD

Various embodiments relate to a data storage system and a method for measuring a change in a spacing between a head and a storage medium of a data storage system.

BACKGROUND

With the application of thermal flying height (FH) control (TFC) technology, the Wallace equation based in-situ FH testing technology has become the main approach to measure the FH of read/write (R/W) heads. In general, one single harmonic of a readback signal is enough for detecting variations in the FH. However, in actual applications, the read head may go off-track and such off-track of the read head changes the amplitude of the readback signal obtained from the storage medium and may be mis-counted as a change in the FH. This is one of the major sources contributing to the FH testing error.

SUMMARY

According to an embodiment, a method for measuring a change in a spacing between a head and a storage medium of a data storage system is provided. The method may include obtaining a first readback signal from the storage medium using the head at a first spacing between the head and the storage medium, determining a first power spectrum density over a frequency range from the obtained first readback signal, obtaining a second readback signal from the storage medium using the head at a second spacing between the head and the storage medium, determining a second power spectrum density over the frequency range from the obtained second readback signal, and providing a measurement indicative of the change in the spacing based on the determined first power spectrum density and the determined second power spectrum density.

According to an embodiment, a data storage system is provided. The data storage system may include a head configured to obtain a first readback signal from a storage medium at a first spacing between the head and the storage medium and to obtain a second readback signal from the storage medium at a second spacing between the head and the storage medium, and a circuit configured to determine a first power spectrum density over a frequency range from the first readback signal, and to determine a second power spectrum density over the frequency range from the obtained second readback signal, and further configured to provide a measurement indicative of a change in the spacing between the head and the storage medium based on the determined first power spectrum density and the determined second power spectrum density.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of a method are analogously valid for a device, and vice versa.

In the context of various embodiments, the articles "a", "an" and "the" as used with regard to a feature or element may include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

Various embodiments relate to an in-situ flying height measurement technique, for example a measurement technique based on the intrinsic magnetic media field of a data storage medium. Various embodiments further relate to a data storage system incorporating the in-situ flying height measurement technique of various embodiments.

Various embodiments may employ a method that may address or minimise the flying height (FH) testing error encountered when using the conventional one single harmonic approach. The method of various embodiments may be based on a ratio of power spectrum densities at a single harmonic.

Various embodiments may provide an approach or a method that may be applicable to a storage medium (e.g. a disk) having a random data pattern. As such, various embodiments may be applicable to a storage medium without the necessity to have any specific data pattern written to the storage medium for the purposes of measuring changes in the flying height (FH). In various embodiments, measurements of changes in the flying height (FH) may be carried out based on an arbitrary data pattern written in the storage medium.

Various embodiments may provide a method and a system (e.g. a data storage system) which may measure a change in the flying height (FH), i.e. relative FH change measurement. The term "flying height" and its acronym "FH" refer to the spacing between a head (e.g. a read/write head, e.g. a read head) and a storage medium (e.g. a magnetic recording medium, or a disk, e.g. a hard disk) of, for example, a data storage system. In other words, the flying height refers to the spacing of the head relative to the storage medium.

Various embodiments may provide a method and a system which may measure a change in the flying height (FH) based on a power spectrum or power spectrum density of a readback signal over a frequency band or range. The readback signal may be obtained from a data storage medium (e.g. a disk). As non-limiting examples, the change in the flying height (FH) may be measured based on the power spectrum or power spectrum density of the intrinsic field (e.g. magnetic field) of the storage medium, or the AC erased medium background field, or the power spectrum or power spectrum density of a data pattern, which may be a random data pattern or a non-random data pattern, of the data storage medium.

In various embodiments, FH testing or measurement of the change in the FH may be carried out by performing a respective integration operation of the respective power spectrum density of respective readback signal, corresponding to different FHs, obtained from a data storage medium over a band of testing frequencies, for example between 0 and about 3 GHz. The integration operation may eliminate or at least minimise the noises of the power spectrum signal, thereby allowing testing of the FH at a high precision compared to conventional approaches.

Various embodiments may not require writing any special or particular data pattern for the purposes of the FH testing or measurements of the change in the FH. The FH measurements of various embodiments may be conducted on virgin disk media without any data written into the disk media, or the measurements performed may be based on the data pattern, which for example may be arbitrary, written into the disk media. The methods of various embodiments may be performed at any stages of component test, including at the stage of the final drive system level test.

Furthermore, in various embodiments, a sensor (e.g. a contact sensor) may be provided to measure the absolute FH value. The sensor may be provided, for example, in a slider, incorporating read/write heads, in a data storage system (e.g. in a hard disk drive).

Figure 1A:
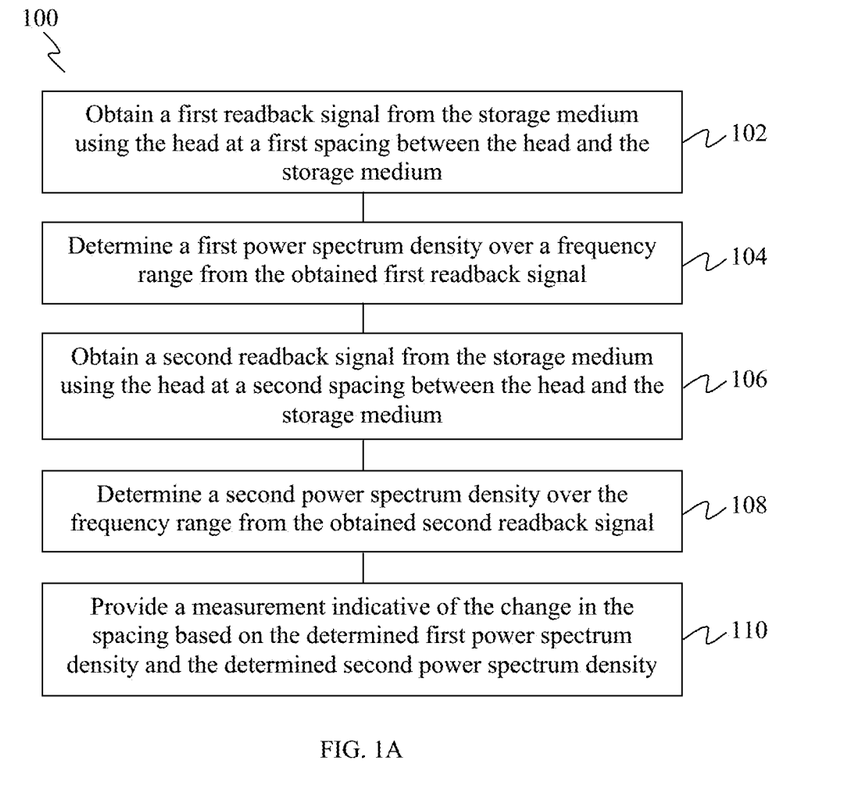
FIG. 1A shows a flow chart illustrating a method for measuring a change in a spacing between a head and a storage medium of a data storage system, according to various embodiments.

FIG. 1A shows a flow chart 100 illustrating a method for measuring a change in a spacing between a head and a storage medium of a data storage system, according to various embodiments.

At 102, a first readback signal is obtained from the storage medium using the head at a first spacing between the head and the storage medium. In various embodiments, the first spacing may be a reference spacing or FH, e.g. an initial spacing or FH.

At 104, a first power spectrum density over a frequency range is determined from the obtained first readback signal.

At 106, a second readback signal is obtained from the storage medium using the head at a second spacing between the head and the storage medium. In various embodiments, the second spacing may be another spacing or FH, different from the first spacing.

At 108, a second power spectrum density over a frequency range is determined from the obtained second readback signal At 110, a measurement indicative of the change in the spacing is provided based on the determined first power spectrum density and the determined second power spectrum density. The change in the spacing refers to the difference between the first spacing and the second spacing or in other words, the distance traversed by the head between the first spacing and the second spacing.

In various embodiments, at 104, a plurality of power spectra may be determined over the frequency range so as to determine the first power spectrum density. Each power spectrum may be determined over a frequency step, $\Delta f$, within the frequency range. Therefore, different power spectra may be determined over a common frequency step (e.g. 0.75 MHz) over the frequency range. In one embodiment, the first power spectrum density may be constructed by a plurality of successive power spectra determined over a particular frequency step, from a lower end frequency, $f_1$, of the frequency range to the higher end frequency, $f_2$, of the frequency range. As a non-limiting example, where $f_1$=100 MHz, $f_2$=130 MHz and $\Delta f$=0.75 MHz, a power spectrum within 100-100.75 MHz may be determined, followed by a power spectrum within 100.75-101.50 MHz, and so on, until $f_2$. The plurality of power spectra may be determined successively or randomly.

In various embodiments, at 108, a plurality of power spectra may be determined over the frequency range so as to determine the second power spectrum density. Each power spectrum may be determined over the frequency step, $\Delta f$, within the frequency range. The approach as described in the context of determining the plurality of power spectra corresponding to the first power spectrum density at 104 may similarly be applicable.

In various embodiments, at 110, the first power spectrum density determined at 104 and the second power spectrum density determined at 108 may be integrated, in other words a respective integration operation may be performed on the first power spectrum density and the second power spectrum density, to provide the measurement indicative of the change in the spacing between the head and the storage medium. In other words, integration of the first power spectrum density and the second power spectrum density may be performed and the integrals may be used in the determination of the change in the spacing between the head and the storage medium.

Figure 1B:
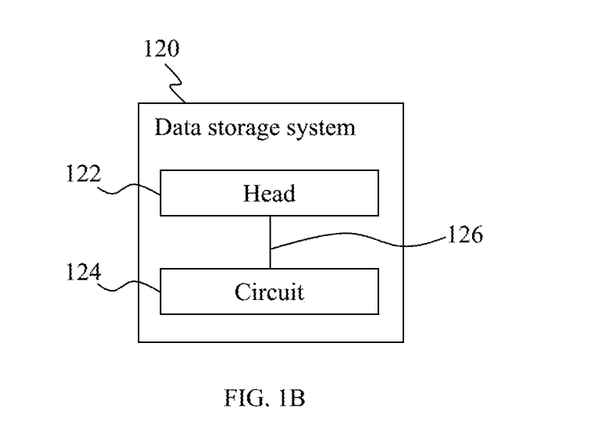
FIG. 1B shows a schematic block diagram of a data storage system, according to various embodiments.

FIG. 1B shows a schematic block diagram of a data storage system 120, according to various embodiments. The data storage system 120 includes a head 122 configured to obtain a first readback signal from a storage medium at a first spacing between the head and the storage medium and to obtain a second readback signal from the storage medium at a second spacing between the head and the storage medium, and a circuit 124 configured to determine a first power spectrum density over a frequency range from the first readback signal, and to determine a second power spectrum density over the frequency range from the obtained second readback signal, and further configured to provide a measurement indicative of a change in a spacing between the head 122 and the storage medium based on the determined first power spectrum density and the determined second power spectrum density. The line represented as 126 is illustrated to show the relationship between the head 122 and the circuit 124, which may include electrical coupling and/or mechanical coupling.

The circuit 124 may be further configured to determine a plurality of power spectra for determining the first power spectrum density over the frequency range, each power spectrum being determined over a frequency step, $\Delta f$.

The circuit 124 may be further configured determine a plurality of power spectra for determining the second power spectrum density over the frequency range, each power spectrum being determined over the frequency step, $\Delta f$.

The circuit 124 may be further configured to integrate the first power spectrum density and the second power spectrum density, in other words to perform a respective integration operation on the first power spectrum density and the second power spectrum density, to provide the measurement indicative of the change in the spacing.

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a 'circuit' in accordance with an alternative embodiment.

In various embodiments, the data storage system 120 may further include the storage medium from which the first readback signal and the second readback signal may be obtained.

In the context of various embodiments of the method of the embodiment of FIG. 1A and the data storage system 120 of the embodiment of FIG. 1B, the measurement may be expressed as $$\Delta FH = \frac{v \sum_{i=1}^{n} \Delta f \cdot \ln PSD(f_1 + i\Delta f) - \sum_{i=1}^{n} \Delta f \cdot \ln PSD_0(f_1 + i\Delta f)}{-\pi(f_2^2 - f_1^2)},$$ (Equation 1)

where $\Delta FH$ is the change in the spacing between the head and the storage medium, v is the linear velocity between the head and the storage medium, $f_1$ is the lower end frequency of the frequency range, $f_2$ is the higher end frequency of the frequency range, $\Delta f$ is the frequency step (e.g. frequency step corresponding to the power spectrum), $PSD_0$ is the power spectrum density determined at the first spacing, PSD is the power spectrum density determined at the second spacing, and $PSD(f_1+i\Delta f)$ and $PSD_0(f_1+i\Delta f)$ represent function operations.

In the context of various embodiments, the storage medium may be free of data.

In the context of various embodiments, the first readback signal and the second readback signal may be based on an intrinsic field of the storage medium or a data pattern stored on the storage medium. The data pattern may be a random data pattern.

In the context of various embodiments, the first readback signal and/or the second readback signal may be referred to as the "readback signal". Therefore, the term "readback signal" may include a reference to one or more readback signals, corresponding to the respective spacings or FHs between the head and the storage medium.

In the context of various embodiments, the head may be suspended over a surface of the storage medium, e.g. a magnetic or magneto-optical disk which holds or stores data in the form of a series of variations in disk surface magnetic orientations recorded in or on the disk. The head may detect the variations in the magnetic orientations on the storage medium, which are representative of the data, as the disk rotates, and a readback signal may be produced therefrom. The readback signal is produced from the read sensor or head, which detects the magnetic field change at the air bearing surface of the read head due to the change of magnetizations in the storage medium.

In other various embodiments, the readback signal may be obtained based on the intrinsic field (e.g. magnetic field) of the storage medium, for example where the storage medium may be free of data.

In the context of various embodiments, the term "head" may include a magnetic head. In addition, the "head" may refer to the read/write head for reading/writing information or data to a storage medium, e.g. the read head.

In the context of various embodiments, the term "storage medium" may include a disk, including a hard disk in a hard disk drive.

In various embodiments, a respective power spectrum density of the readback signal corresponding to a particular spacing between the head and the storage medium, over a frequency range, may be determined. Subsequently, a measurement indicative of the change in the spacing between the head and the storage medium (i.e. the FH) may be provided or determined based on the respective power spectrum densities determined over the frequency range.

In the context of various embodiments, the power spectrum density may provide information relating to the power of a signal (e.g. readback signal) in a particular spectral or frequency component within the frequency range. In order to provide the information relating to the power of the signal at the frequency component, the power spectrum of the signal over a frequency step, centred on the frequency of the frequency component, may be determined. The power spectrum may provide information relating to the power within the frequency step.

In the context of various embodiments, the total power in the signal may be determined by integrating the power spectrum density within the frequency range, or in other words, the total power is an integral of the power spectrum density over all frequencies within the frequency range.

In the context of various embodiments, the change in the spacing (FH) measurable by the methods of various embodiments may be in the range of between about 0.01 nm and about 50 nm.

In the context of various embodiments, the absolute spacing (FH) measurable by the methods of various embodiments may be in the range of between about 0 nm and about 50 nm.

In the context of various embodiments, the frequency range may be between 0 and about 3 GHz. In the context of various embodiments, a smaller testing frequency range may be defined from a portion of the above frequency range for measurement of the change in FH, for example between 0 and about 2 GHz, between 0 and about 1 GHz, between 0 and about 0.5 GHz, between 0 and about 0.3 GHz, between about 0.02 GHz and about 0.2 GHz, between about 0.05 GHz and about 1 GHz, or any narrower range of any of the above defined ranges.

In the context of various embodiments, the frequency step, $\Delta f$, for the power spectrum may be between about 0.05 MHz and about 3 MHz, for example 0.05 MHz, 0.1 MHz, 0.5 MHz, 1 MHz, or any value up to 3 MHz.

In a hard disk drive (HDD), a slider, with read/write (R/W) heads (or read/write elements), flies over a surface of a data storage medium, with the read/write heads employed for reading/writing information or data to the storage medium. The slider may be spaced from the surface of the storage medium at a sufficiently high and robust flying height (FH), and the FH of the read/write heads, relative to the surface of the storage medium, may be adjusted (e.g. decreased) by employing thermal FH control (TFC) technology during read/write processes.

Figure 2:
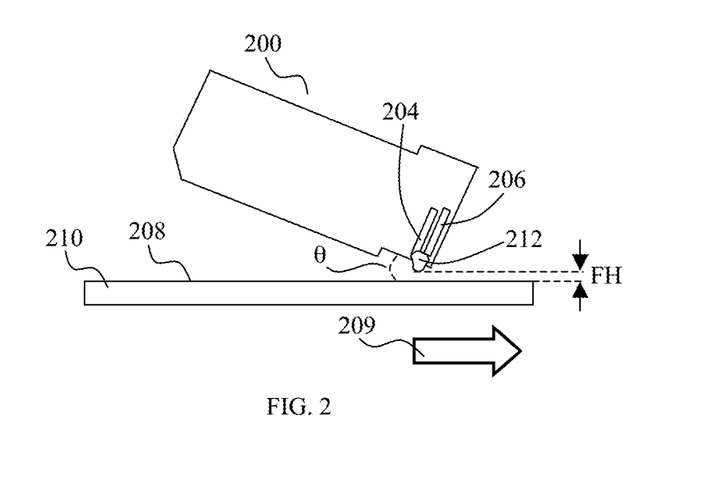
FIG. 2 shows a schematic diagram of a thermal fly height control (TFC) slider, according to various embodiments.

FIG. 2 shows a schematic diagram of a thermal fly height control (TFC) slider 200, according to various embodiments. The slider 200 includes read/write (R/W) heads, for example a read head 204 and a write head 206. The slider 200, including the read head 204 and the write head 206, flies over a surface 208 of a data storage medium (e.g. a disk) 210. The read head 204 and the write head 206 are spaced from the surface 208 of the disk 210 by a gap or spacing, termed as the flying height (FH). During operation, the disk 210 rotates and its moving direction relative to the slider 200 is along the arrow 209. While not shown, the slider 200 may include one or more circuitries provided to supply currents to the read head 204 and the write head 206. The slider 200 may be arranged at least substantially parallel to the surface 208 of the disk 210 or the slider 200 be arranged having a pitch angle to the surface 208 of the disk 210. In FIG. 2, the slider 200 is illustrated with a pitch angle, $\theta$, to the surface 208. The size of the pitch angle, $\theta$, in FIG. 2 is exaggerated for clarity purposes.

A heating element or a heater (not shown) may be provided in the slider 200 in thermal communication with the read head 204 and/or the write head 206, for example the heater may be placed in proximity with the read head 204 and/or the write head 206, so as to thermally actuate the read head 204 and/or the write head 206. Furthermore, additional circuitry (not shown) may be provided in the slider 200 to supply currents to the heating element.

In various embodiments, during the read/write process, a small portion of the read head 204 and/or the write head 206 at the ends of the read head 204 and/or the write head 206 may expand and may protrude further out from the slider 200 for conducting the read and write processes or operations. Therefore, the FH may be reduced due to the thermal protrusion 212 of the read head 204 and/or the write head 206. During the TFC process, one or both of the read head 204 and the write head 206 may be thermally actuated, for example by means of the heating element. Therefore, the FH may be adjusted by changing (e.g. increasing) the operating temperature of the heating element, which for example may be placed at the back of the read/write heads. By controlling the temperature of the heating element, the read head 204 and/or the write head 206 may extend or contract, relative to their initial positions at a particular reference temperature. In addition, the mechanical flying height of the read head 204 and/or the write head 206 may change with different positions on the disk 210. In FIG. 2, the size of the thermal protrusion 212 is exaggerated for clarity purposes.

Therefore, in various embodiments, different heating power levels may be supplied to the heating element to provide different amounts of heat to the read head 204 and/or the write head 206 so as to thermally actuate the read head 204 and/or the write head 206 to control the thermal protrusion 212 to achieve different FHs, thereby compensating for changes to the thermal protrusion 212 of the read head 204 and/or the write head 206, and therefore also changes to the FH.

In the context of various embodiments, the thermal protrusion 212 refers to the amount or distance by which the read head 204 and/or the write head 206 may extend towards the surface 208 of the disk 210.

In various embodiments, during the TFC process, the thermal protrusion 212 may protrude towards the surface 208 by between 0.01 nm and about 20 nm.

Figure 3:
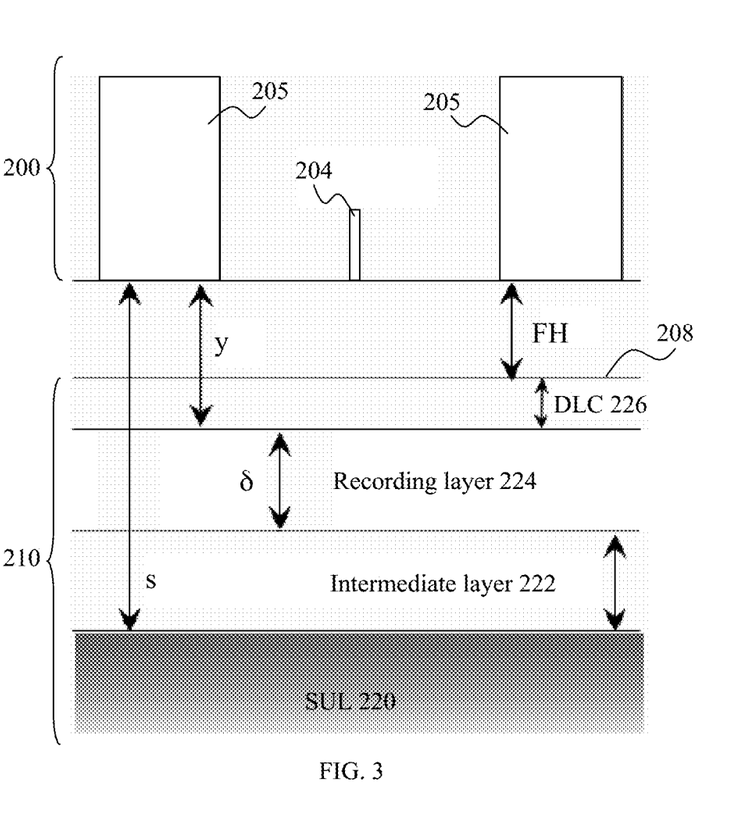
FIG. 3 shows a schematic cross sectional view of an arrangement of a read head relative to a storage medium, according to various embodiments.

FIG. 3 shows a schematic cross sectional view of an arrangement of a read head 204 of a slider 200, relative to a storage medium 210, according to various embodiments. The read head 204 may be a giant magnetoresistive (GMR) read sensor, for detecting a readback signal. For clarity purposes, the write head is not shown in FIG. 3. In various embodiments, the slider 200 further includes a pair of shields 205, e.g. of a soft magnetic material, for shielding magnetic flux from adjacent bits, representative of the data recorded, in the storage medium 210.

FIG. 3 illustrates the arrangement for a non-limiting example of perpendicular recording (or perpendicular magnetic recording, PMR) of data on the storage medium 210.

In various embodiments, the storage medium 210 may include a soft (or ferromagnetically soft) underlayer (SUL) 220, an intermediate layer 222 arranged over the SUL 220, a recording layer 224 arranged over the intermediate layer 222, and an overcoat layer, e.g. a diamond-like carbon (DLC) overlayer 226, arranged over the recording layer 224.

The SUL 220 may conduct magnetic flux and may guide the magnetic flux from a write head to produce a strong write field at the space between the tip of the write head and the SUL 220, and therefore within the recording layer 224 for writing data in the recording layer 224. In addition, the magnetic bits, representative of the data, recorded in the recording layer 224 has a mirror magnetic image in the SUL 220. This enhances the readback signals, for example at lower recording frequency. In various embodiments, the SUL 220 may be of a material including but not limited to cobalt-iron (CoFe) or cobalt-iron-zirconium-boron (CoFeZrB).

The intermediate layer 222 may control the magnetic orientation of magnetic grains in the recording layer 224 and may also create the seeds for the growth of the magnetic grains in the recording layer 224.

In perpendicular data recording, the "magnetic bits", representative of the data recorded in the recording layer 224, point upwardly or downwardly, perpendicular to the disk surface 208. In other words, the poles of the magnetic elements, which represent the "magnetic bits", are aligned perpendicular to the disk surface 208.

In various embodiments, the recording layer 224 may be or may include a ferromagnetic hard material layer. The hard magnetic material layer may include column growth magnetic grains in sub-10 nm grain size separated by non-magnetic grain boundary materials. Each of the grains in the recording layer 224 may be magnetized independently, for example under an applied external magnetic field. In various embodiments, the recording layer 224 may be of a material including but not limited to cobalt-chromium-platinum (CoCrPt) or cobalt-chromium-platinum-boron (CoCrPtB) or a combination of cobalt-chromium-platinum and silicon oxide (CoCrPt:SiO$_2$).

The (DLC) overlayer 226 may provide a protective coating or layer to minimise damage to the storage medium 210.

As illustrated in FIG. 3, the parameter "y" refers to the head media spacing (HMS), or in other words the distance between the read head 204/write head and the recording layer 224. The head media spacing, y, includes the FH and any non-mechanical spacing, such as head medium overcoats and lubricant. For illustration purposes, the non-mechanical spacing is not illustrated in FIG. 3 but as part of the DLC overlayer 226. The parameter "δ" refers to the thickness of the recording layer 224. The parameter "s" refers to the head keeper spacing (HKS), or in other words the distance between the read head 204/write head and the SUL 220.

In perpendicular recording in the storage medium 210 with the soft underlayer (SUL) 220, the readback signal, V, as determined in a readback process, may be expressed as $$V(y, s) = V_0 \frac{[\sinh k(s-y) - \sinh k(s-\delta-y)]}{\sinh ks}, \quad \text{(Equation 2)}$$

where, $V_0$ refers to the readback signal amplitude at low frequency, k is the wavenumber ($=2\pi/\lambda$, where λ refers to wavelength), and the parameters "y", "δ" and "s" are as described above in relation to FIG. 3. As a non-limiting example, when a single tone signal is being recorded, all the bits may be of equal length, termed as bit length which refers to the length of one bit. The wavelength, λ, may be equal to 2 times of the bit length.

When there is a change in the FH, ΔFH, the respective signal amplitudes measured at different FHs may be used to calculate the change in FH based on an amplitude ratio, $A_a$, which may be expressed as $$A_a(k, \Delta FH) = \frac{V(y_0 + \Delta FH, s_0 + \Delta FH)}{V(y_0, s_0)}, \quad \text{(Equation 3)}$$

where $y_0$ refers to the initial head media spacing, while $s_0$ refers to the initial head keeper spacing.

Based on Equation 3, the amplitude ratio, $A_a$, may also be expressed as Equation 4 below $$A_a(k, \Delta FH) = \frac{\sinh ks_0}{\sinh k(s_0 + \Delta FH)}. \quad \text{(Equation 4)}$$

When $\lambda < 2\pi s_0$, Equation 4 may be approximated to $[e^{\wedge}(-k\Delta FH)]$ as shown in Equation 5 below $$A_a(k, \Delta FH) \approx e^{-k\Delta FH} \quad \text{(Equation 5)}.$$

As the wavelength, λ, is less than $2\pi s_0$, the amplitude ratio, $A_a$, may be reduced to the form of the traditional Wallace equation and the FH change may be approximated as $$\Delta FH = -\frac{\lambda}{2\pi} \ln\left(\frac{V_1}{V_{10}}\right), \quad \text{(Equation 6)}$$

where $V_{10}$ is the signal amplitude at the initial FH (e.g. a reference FH, e.g. without a thermal protrusion), and $V_1$ is the signal amplitude at another FH (e.g. where there may be a thermal protrusion). This is what is conventionally carried out to monitor the TFC process, which is to monitor the FH by detecting the intensity of the readback signal and the Wallace equation being used to calculate changes in the FH, based on a single high frequency. However, in the actual data storage system (e.g. disk drive), there may be a number of possible sources that may cause FH modulation, e.g. variations in parameters at different disk locations, which may adversely affect FH measurement based on the Wallace equation.

For perpendicular recording, the soft underlayer (SUL) may be required to double the write ability. The magnetic charge image in the SUL 220, however, changes the Wallace equation into a hyperbolic formula, which may affect the FH measurements at lower frequencies or longer wavelengths.

In various embodiments, the change in the FH may be calculated or determined using a single harmonic method based on the ratio of power spectrum densities at a particular frequency, which may enable cancellation of storage medium magnetic fluctuations and slight off-track during measurements. In addition, there may be a need to compare the FH change or modulation at different positions on the storage medium and the ratio method of various embodiments may be employed to cancel the magnetic fluctuations in the storage medium, which may occur due to dissimilar magnetic properties at the different positions, and a certain level of off-track. In various embodiments, a frequency band of power spectrum density of the readback signal may be used to determine the changes in the FH.

The ratio, $A_s$, of power spectrum densities, at a particular frequency (e.g. testing frequency), $f_i$, for different FHs may be expressed as $$A_s\left(k_i = \frac{2\pi f_i}{v}, \Delta FH\right) = \frac{PSD(f_i)}{PSD_o(f_i)} = e^{\wedge}\left(-\frac{2\pi f_i}{v} \Delta FH\right), \quad \text{(Equation 7)}$$

where v refers to the linear velocity between the head (e.g. read/write head, e.g. read head) and the storage medium (e.g. a disk), ΔFH refers to the change in the FH, $PSD_0$ refers to the power spectrum density at the initial FH at $f_i$, PSD refers to the power spectrum density at another particular FH at $f_i$, and "^" represents a power operator (e.g. $e^{\wedge}5 = e^5$).

For a frequency band or range of the power spectrum density, based on Equation 7, the change in the FH, ΔFH, may be determined by $$\Delta FH = \frac{v \sum_{i=1}^{n} \Delta f \cdot \ln[PSD(f_1 + i\Delta f)] - \sum_{i=1}^{n} \Delta f \cdot \ln[PSD_0(f_1 + i\Delta f)]}{-\pi(f_2^2 - f_1^2)}, \quad \text{(Equation 8)}$$

where Δf refers to the frequency step of the measured power spectrum corresponding to the respective power spectrum densities, $f_1$ refers to the lower end frequency of the frequency range, and $f_2$ refers to the higher end frequency of the frequency range. As the reference parameter $PSD_0$ is included, other parameters related to the signal amplitude are effectively removed from the ratio calculation. It should be appreciated that when $f_2 = f_1$, Equation 8 may be reduced to the form of Equation 7.

Measurements demonstrating the applicability of Equation 8 in measuring or determining a change in the FH will now be described in relation to the following non-limiting examples.

In a non-limiting example of measurements, the track(s) of a disk medium, on which data may be written, is AC erased. In the AC erasing process, an alternating current (AC) bias field at high frequency (e.g. more than 2T frequency in a disk drive, where "T" refers to period) is applied to the write head as the write head passes over the track(s) of the disk, erasing the data in the recording track(s). Using an AC signal to erase the data may result in a low readback noise.

A readback signal may be obtained and power spectrum signals may be measured/obtained based on the readback signal over a frequency range, for example from 0 to about 300 MHz.

The power spectrum of the readback signal may be measured using a spectrum analyzer with a suitable setting of start/stop frequencies and resolution bandwidth. As a non-limiting example, the start frequency may be 0, the stop frequency may be about 300 MHz, and the resolution bandwidth may be about 0.3 MHz. The power spectrum of the readback signal may also be determined using a digital oscilloscope by performing the FFT (Fast Fourier Transform) of the captured readback signal. The magnitude of the FFT may be in log scale and converted into dB.

Figure 4:
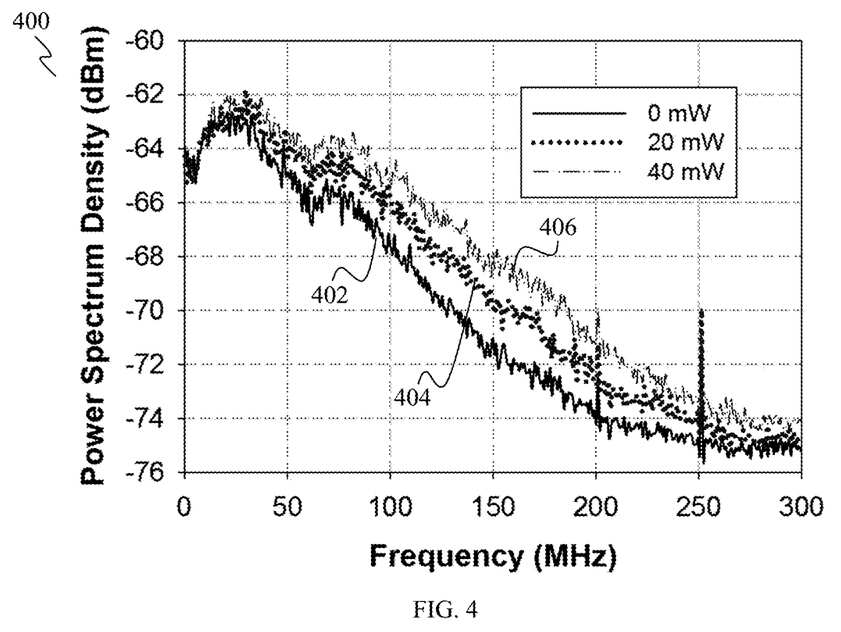
FIG. 4 shows a plot of measured power spectrum density as a function of frequency, based on an alternating current (AC) erased storage medium, for different heater powers, according to various embodiments.

FIG. 4 shows a plot 400 of measured power spectrum density as a function of frequency, based on an alternating current (AC) erased storage medium, for different heater powers, according to various embodiments. The heater power refers to the power supplied to a heating element or a heater for supplying thermal energy to the read/write heads, thereby thermally actuating the read/write heads. Therefore, by supplying different heater power to the heating element/heater, different FHs may be provided.

The plot 400 shows the results of the measured power spectrum density over the frequency span of 0 to 300 MHz, for a heater power of 0 mW 402 (i.e. no power supplied to the heater) where there may be no or minimal thermal protrusion of the read/write heads, thereby providing an initial FH. The plot 400 also shows the results of the measured power spectrum density for a heater power of 20 mW 404, and a heater power of 40 mW 406.

As shown in FIG. 4, as the heater power increases, corresponding to changes in the FH in which the FH is reduced, the power spectrum density corresponding to a higher heater power is higher than the power spectrum density corresponding to a lower heater power at a particular frequency as the read head reproduces a stronger signal at a lower FH.

Figure 5:
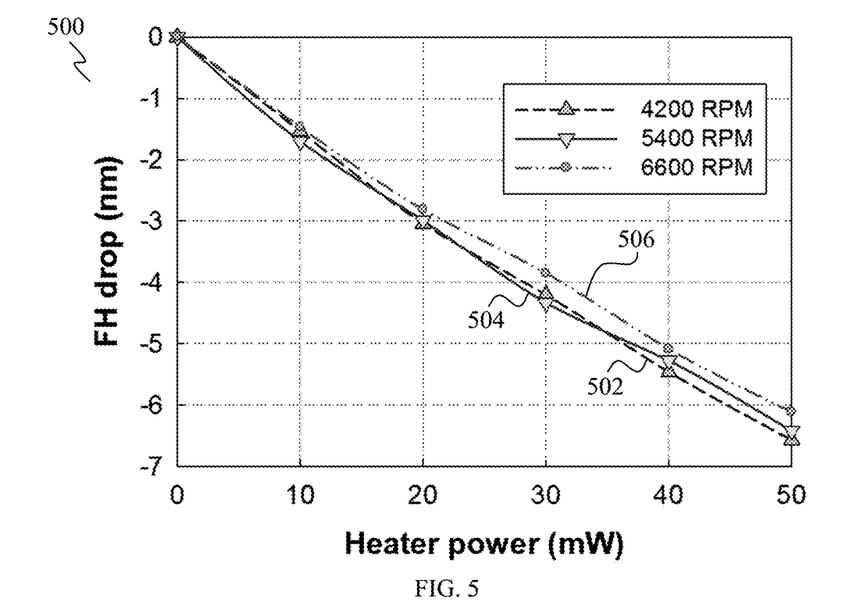
FIG. 5 shows a plot of flying height (FH) changes as a function of heater power, during a head touchdown process, for different spindle speeds, according to various embodiments.

FIG. 5 shows a plot 500 of flying height (FH) changes as a function of heater power, during a head touchdown process, for different spindle speeds, according to various embodiments. The measurements shown in FIG. 5 were obtained based on the read/write heads and the (AC) erased storage medium used for obtaining the measurements shown in FIG. 4. In the context of various embodiments, a touchdown refers to the effective or substantial contact of the read/write heads with the surface of the storage medium, and is a short term contact. In various embodiments, the head touchdowns may be carried out during the initial drive calibration, for example for calibration of the FH, e.g. at the stage of drive assembly and self-test.

In the context of various embodiments, the spindle refers to a mechanical part, which may be rotatable, that may serve as an axis for a rotatable part held by the spindle. As a non-limiting example, the spindle may refer to the mechanical part, in a hard disk drive, that holds a circular disk (or platter) as storage medium that holds data. Therefore, the spindle speed refers to the speed at which the spindle revolves or rotates, and also effectively refers to the rotational speed of the disk held or carried by the spindle. For the results shown in FIG. 5, measurements were performed based on a disk having a radius of about 21.3 mm.

The plot 500 shows the results of changes in the FH as a function of heater powers ranging from 0 to about 50 mW with a 10 mW step, for a spindle speed of about 4200 rpm (revolutions per minute) 502, a spindle speed of about 5400 rpm 504, and a spindle speed of about 6600 rpm 506.

For the spindle speed of about 5400 rpm 504, for calculation based on Equation 8, $f_1$ was set to about 105 MHz, $f_2$ was set to about 135 MHz and $\Delta f$ was set to about 0.75 MHz. As illustrated in FIG. 5, at the spindle speed of about 5400 rpm 504, the change in the FH (FH drop) in which the read/write heads expand from the initial FH towards the disk, thereby causing a reduced FH, is about 6.3 nm corresponding to the heater power of about 50 mW. This is comparable to the result obtained using the conventional Wallace-based testing.

Measurements were also conducted for spindle speeds of about 4200 rpm and about 6600 rpm, based on similar parameters used for measurement at the spindle speed of about 5400 rpm, where the results are shown in FIG. 5. For a fairer or more effective comparison, the wavelength band was kept constant, and the frequency range was correspondingly changed. For the spindle speed of about 4200 rpm 502, both $f_1$ and $f_2$ may be multiplied by the ratio of approximately 0.778 (=4200/5400), thereby providing effective frequencies, $f_{1\ (4200)}$ of about 81.69 MHz and $f_{2\ (4200)}$ of about 105.03 MHz. For the spindle speed of about 6600 rpm 506, both $f_1$ and $f_2$ may be multiplied by the ratio of approximately 1.222 (=6600/5400), thereby providing effective frequencies, $f_{1\ (6600)}$ of about 128.31 MHz and $f_{2\ (6600)}$ of about 164.97 MHz.

The results shown in FIG. 5 illustrate that the method of various embodiments may be able to provide testing of the FH, in other words measuring the changes in the FH, at high precision, using the noisy power spectrum of the AC erased storage medium, as a result of the integration operation of the power spectrum densities over a band of frequency.

Figure 6:
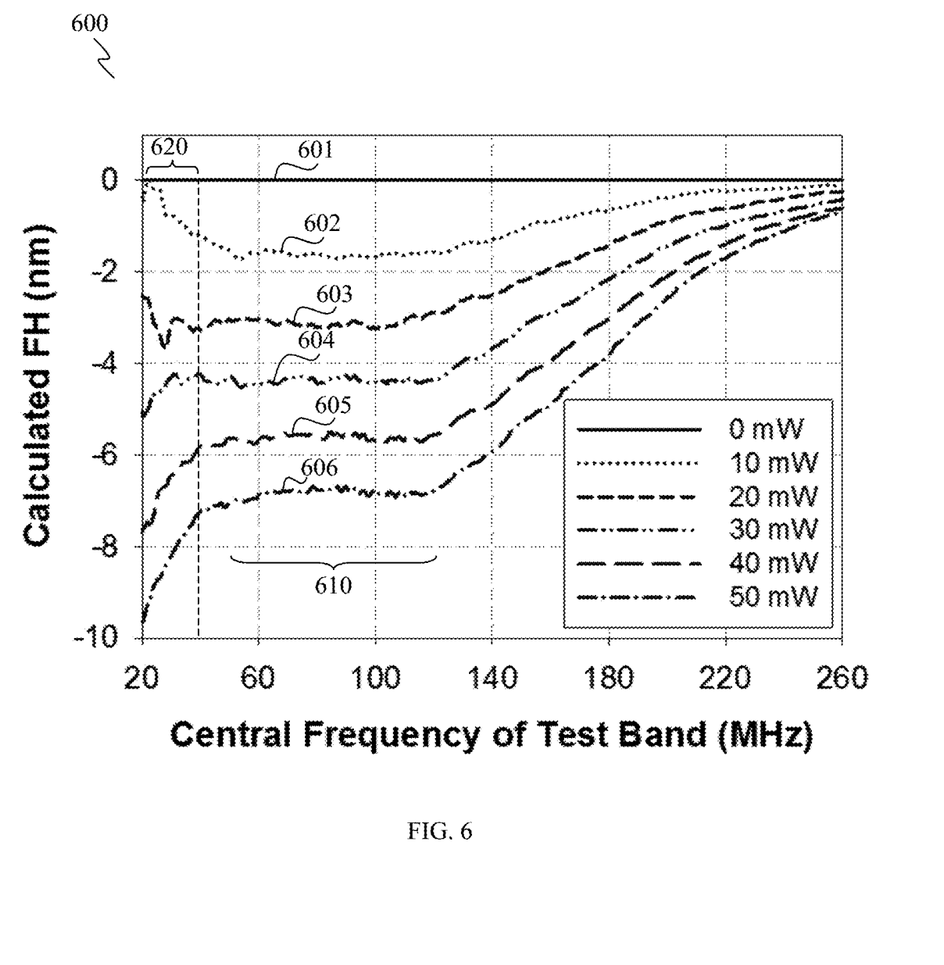
FIG. 6 shows a plot of flying height (FH) changes as a function of center frequency, during a head touchdown process, for different heater powers, according to various embodiments.

In a non-limiting example, the change or drop in FH during a touchdown process was determined over a full spectrum of 0 to 300 MHz, for different heater powers from 0 to 50 mW with a 10 mW step, a spindle speed of about 5400 rpm, and setting $(f_2-f_1)=30$ MHz and $\Delta f=0.75$ MHz, where the results are shown in FIG. 6. FIG. 6 shows a plot 600 of flying height (FH) changes as a function of center frequency, during a head touchdown process, for different heater powers, according to various embodiments. The center frequency may be defined as $[(f_2+f_1)/2]$. For example, for a center frequency of 50 MHz, the associated frequencies, $f_1$ and $f_2$ are 35 MHz and 65 MH, respectively. The measurements shown in FIG. 6 were obtained based on the read/write heads and the (AC) erased storage medium used for obtaining the measurements shown in FIG. 4.

The plot 600 shows the results of changes in the FH as a function of the central frequency ranging from about 20 MHz to about 260 MHz, for respective heater powers of 0 mW 601 (i.e. no power supplied to the heater), 10 mW 602, 20 mW 603, 30 mW 604, 40 mW 605 and 50 mW 606.

As shown in FIG. 6, there may be a wide range of center frequencies, for example between about 50 MHz and about 120 MHz, as represented by 610, where the determined change in the FH may be at least substantially constant for each heater power, for frequencies within 50 MHz to 120 MHz.

At the lower frequency, as represented by 620, the overestimated change in the FH may be due to the soft underlayer (SUL) (e.g. 220, FIG. 2) of the storage medium, as a result of the effect of the magnetic charge image in the SUL. At the higher frequency, the results show a drop in the resolution of the read head. This is because when the bit length approaches or is comparable to the gap length of the read head, the gap loss of the read head may adversely affect the signal amplitude loss at higher frequencies. In various embodiments, a read head may include a free layer sandwiched between two soft magnetic shields and the gap length of the read head refers to the spacing between the free layer and the shields.

The results shown in FIGS. 4 to 6 illustrate that the methods of various embodiments may provide high precision measurements of changes in the flying height (FH). It should be appreciated that while the results of FIGS. 5 and 6 indicate results for FH drop, as a result of an increase in temperature causing expansion of the read/write heads, the methods of various embodiments may also measure the change in the FH in the opposite direction, in other words, an increase in FH, for example as a result of a decrease in temperature causing contraction of the read/write heads, either change from the initial FH or after a FH drop.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for measuring a change in a spacing between a head and a storage medium of a data storage system, the method comprising:
    obtaining a first readback signal from the storage medium using the head at a first spacing between the head and the storage medium;
    determining a first power spectrum density over a frequency range from the obtained first readback signal;
    obtaining a second readback signal from the storage medium using the head at a second spacing between the head and the storage medium;
    determining a second power spectrum density over the frequency range from the obtained second readback signal; and
    providing a measurement indicative of the change in the spacing based on the determined first power spectrum density and the determined second power spectrum density;
    wherein the first readback signal and the second readback signal are based on an intrinsic field or an AC erased field of the storage medium.

2. The method according to claim 1, wherein determining the first power spectrum density over the frequency range comprises determining a plurality of power spectra, each power spectrum being determined over a frequency step.

3. The method according to claim 2, wherein determining the second power spectrum density over the frequency range comprises determining a plurality of power spectra, each power spectrum being determined over the frequency step.

4. The method according to claim 1, wherein providing the measurement comprises integrating the first power spectrum density and the second power spectrum density.

5. The method according to claim 4, wherein the measurement is expressed as:

$$\Delta FH = \frac{v\sum_{i=1}^{n}\Delta f \cdot \ln PSD(f_1 + i\Delta f) - \sum_{i=1}^{n}\Delta f \cdot \ln PSD_0(f_1 + i\Delta f)}{-\pi(f_2^2 - f_1^2)}$$

where
ΔFH: change in the spacing,
v: linear velocity between the head and the storage medium,
$f_1$: lower end frequency of the frequency range,
$f_2$: higher end frequency of the frequency range,
Δf: frequency step
$PSD_0$: power spectrum density determined at the first spacing,
PSD: power spectrum density determined at the second spacing.

6. The method according to claim 1, wherein the storage medium is free of data.

7. The method according to claim 1, wherein the frequency range is between 0 and about 3 GHz.

8. A data storage system comprising:
    a storage medium;
    a head configured to obtain a first readback signal from the storage medium at a first spacing between the head and the storage medium and to obtain a second readback signal from the storage medium at a second spacing between the head and the storage medium, wherein the first readback signal and the second readback signal are based on an intrinsic field or an AC erased field of the storage medium; and
    a circuit configured to determine a first power spectrum density over a frequency range from the first readback signal, and to determine a second power spectrum density over the frequency range from the obtained second readback signal, and further configured to provide a measurement indicative of a change in the spacing between the head and the storage medium based on the determined first power spectrum density and the determined second power spectrum density.

9. The system according to claim 8, wherein the circuit is further configured to determine a plurality of power spectra for determining the first power spectrum density over the frequency range, each power spectrum being determined over a frequency step.

10. The system according to claim 9, wherein the circuit is further configured to determine a plurality of power spectra for determining the second power spectrum density over the frequency range, each power spectrum being determined over the frequency step.

11. The system according to claim 8, wherein the circuit is configured to integrate the first power spectrum density and the second power spectrum density to provide the measurement.

12. The system according to claim 11, wherein the measurement is expressed as:

$$\Delta FH = \frac{v\sum_{i=1}^{n}\Delta f \cdot \ln PSD(f_1 + i\Delta f) - \sum_{i=1}^{n}\Delta f \cdot \ln PSD_0(f_1 + i\Delta f)}{-\pi(f_2^2 - f_1^2)}$$

where
ΔFH: change in the spacing,
v: linear velocity between the head and the storage medium,
$f_1$: lower end frequency of the frequency range,
$f_2$: higher end frequency of the frequency range,
Δf: frequency step
$PSD_0$: power spectrum density determined at the first spacing, and
PSD: power spectrum density determined at the second spacing.

13. The system according to claim 8, wherein the storage medium is free of data.

14. The system according to claim 8, wherein the frequency range is between 0 and about 3 GHz.

15. The method according to claim 1, wherein the first readback signal and the second readback signal are based on the intrinsic field of the storage medium.

16. The system according to claim 8, wherein the first readback signal and the second readback signal are based on the intrinsic field of the storage medium.

\* \* \* \* \*